(12) United States Patent
Yeh et al.

(10) Patent No.: US 6,366,653 B1
(45) Date of Patent: *Apr. 2, 2002

(54) SYSTEM FOR INTEGRATING A TELEPHONE TO A COMPUTER

(75) Inventors: Chih-Tsang Yeh; Hung-Ta Huang; Chen-Sheng Chen, all of Taipei (TW)

(73) Assignee: Acer Incorporated, Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,910

(22) Filed: Sep. 19, 1996

(51) Int. Cl.⁷ .............................................. H04M 11/00
(52) U.S. Cl. .................................. 379/93.05; 379/93.09
(58) Field of Search ............................... 379/67, 88–89, 379/90.01, 93.05–93.09, 93.14–93.17, 93.23, 110.01, 354–357, 387, 441, 100.08, 93.24, 93.01–93.11; 340/825.5; 345/168–169, 172; 370/461–462; 455/557

(56) References Cited

U.S. PATENT DOCUMENTS

| | | | | |
|---|---|---|---|---|
| 4,313,176 A | * | 1/1982 | Cecil ....................... | 379/93.05 |
| 4,862,498 A | * | 8/1989 | Reed ......................... | 379/354 |
| 4,872,004 A | * | 10/1989 | Bahnick et al. .......... | 340/825.5 |
| 4,987,588 A | * | 1/1991 | Fukuma et al. .......... | 379/93.09 |
| 4,991,199 A | * | 2/1991 | Parekh et al. ............ | 379/93.17 |
| 5,283,819 A | * | 2/1994 | Glick et al. .............. | 379/93.01 |
| 5,526,408 A | * | 6/1996 | Yekutiely ................. | 379/93.26 |
| 5,553,122 A | * | 9/1996 | Haber et al. ............. | 379/93.09 |
| 5,727,047 A | * | 3/1998 | Bentley et al. ........ | 379/100.08 |
| 5,884,191 A | * | 3/1999 | Karpus et al. .............. | 455/557 |

* cited by examiner

*Primary Examiner*—Curtis Kuntz
*Assistant Examiner*—George Eng (57) ABSTRACT

A system (100) for integrating a telephone (106) to a computer. The system allows the computer to be coupled to a Public Branching Exchange (PBX) (108) and perform telephone functions. The telephone is coupled to the computer as a stand alone device, or as a means for command input to the system. A pop-up screen comprising of a sequence of menus is displayed on the computer monitor (101) to guide the user through various telephone functions. A voice guide is heard through the telephone. The user can use the telephone's or the computer's I/O devices to communicate with a distant caller. Answering machine capability (e.g., phone mailbox, etc.) is also provided by this system. A quick-dial service is also provided such that the user can dial directly from a look-up table with pre-set telephone numbers.

19 Claims, 8 Drawing Sheets

SYSTEM FOR INTEGRATING A TELEPHONE TO A COMPUTER

BACKGROUND OF THE INVENTION

This invention generally relates to an integrated computer telephone system with a user friendly interface. More particularly, the invention provides a technique for integrating a computer to a telephone using a combination of hardware and programmable software, but it would be recognized that the invention has a wider range of applicability. Merely by way of example, the invention can be applied to other types of telephones, computers, and the like.

Conventional telephones having various digital functions, commonly termed smart telephones, have been introduced into market and used in workplace offices for numerous years. Some of these functions include quick-dial access and answering machine capability. These telephones are, however, often expensive and their functions are typically limited without any capability for upgrades.

Computers also have been used in the office workplace for numerous years as stand-alone units. They generally come with a variety of software applications for providing functions such as word processing, database management, spreadsheets, and the like. More recently, computers have been connected together in networks such as local operating networks (LANs) and others. These networks typically include a server and numerous computer workstations all connected together in a variety of configurations.

These computers, however, generally lack telephone functions. Accordingly, most offices have both telephones and computers that work independently from each other. These telephones and computers are generally provided in the offices using separate systems. That is, each of these offices has a telephone system which is separate from the computer system.

As computers gain even more popularity in the office work-place, it may be desirable to integrate functions of the telephone with the computer in an economical manner. There are, however, simply no easy techniques of integrating the computer with the telephone.

As can be seen, a technique for integrating a computer to a telephone in an easy, economical, and efficient manner is highly desirable.

SUMMARY OF THE INVENTION

The present invention provides a technique including a method and apparatus for integrating a telephone to a computer. This technique provides various telephone functions on the computer with user friendly interfaces using programmable software, and computer and telephone hardware.

In a specific embodiment, the invention provides a system for integrating a computer with a telephone using hardware and software. The system includes an interface module and a telephone operably coupled to the interface module. Also included is a motherboard comprising a microprocessor and memory. The motherboard is operably coupled to the interface module. The invention operates in cooperation with a PBX, and to that end, the interface module reports the status of the telephone to the PBX system and vice versa. The interface module also reports the status of the telephone and the PBX system to the computer so that appropriate procedures can be invoked. Selected key codes are sent from the interface module to the motherboard through a keyboard interface. Commands from the motherboard are also sent to the interface module in a similar manner. The system may further include a PBX system operably coupled to the interface module. Moreover, the system may further include a keyboard arbitrator device, which prevents a possible conflict between a keyboard signal transmitted by a keyboard and a signal derived from the telephone transmitted by the interface module.

In an alternative specific embodiment, the present invention provides a "plug-and-play" method of integrating a telephone with a computer. The present method includes providing a computer having a motherboard, which has a microprocessor-type unit, a memory, and a motherboard port. The method also provides a telephone having a telephone port, and an interface module having an interface module port and an interface module telephone port. Plug-and-play operation occurs by connecting the computer to the interface module by connecting the motherboard port (e.g., keyboard port, etc.) to the interface module port using standard lines. In some embodiments, the interface module is inserted into an expansion slot in a computer to further provide "plug-and-play" features. A further step is connecting the telephone to the interface module using the interface module telephone port and the telephone port. A keyboard also may be provided through the interface module.

A further specific embodiment provides a computer having telephone functions using a graphical user interface. The computer includes a monitor comprising a display, which depicts a keypad comprising telephone numbers such as 1, 2, 3, 4, 5, 6, 7, 8, 9, 0, *, and # on the display, and a menu listing applications. A telephone is operably coupled through an interface module to this monitor to provide the telephone functions.

An additional embodiment of the present invention provides an apparatus for telecommunication. The apparatus generally includes a motherboard comprising a microprocessor and a memory, and an interface module. The interface module includes a first interface module port for transmitting a signal to a motherboard port and a second interface module port for receiving a signal from a user interface device. The second interface module port is coupled to the first interface module port. The apparatus also includes an interface module telephone port for receiving and transmitting a telephone signal from and to a telephone. The interface module telephone port is coupled to the first interface module port.

Still further, the present invention provides an interface module having selected ports for connecting a telephone to a computer. The interface module includes a first interface module port for transmitting signals to a motherboard port, a second interface module port for receiving signals from a user interface device, and an interface module telephone port for receiving and transmitting a telephone signal from and to a telephone.

The invention provides various benefits. For instance, telephone functions can be run as an application program, where upgrades to the telephone functions can be made by software modifications. A variety of status and command signals between the interface module and the CPU can be communicated through an easy-to-use graphical interface. There is often no need for hardware-type adjustments using jumpers since no interrupt conflicts generally occur using the present interface module, which allows the phone to be a stand-alone unit while the computer is powered-on or powered-off. Additionally, more I/O ports would generally not be needed for this present system, which complies with plug-and-play principles and simplifies installation procedures using the present interface module.

Some of the benefits of the present invention achieved in the context of known technology are shown above. However, a further understanding of the nature and advantages of the present invention may be realized by reference to the latter portions of the specification and attached drawings.

DESCRIPTION OF THE SPECIFIC EMBODIMENT

A system for integrating a telephone to a computer is provided. The present invention includes both hardware and software, which can be combined even further or separated, depending upon the application. In the following description, the software part is referred to as the telephone program, and the hardware part is referred to by selected names given in block diagrams. Signal levels are referred to as active or inactive, as opposed to high or low, 1 or 0. These descriptions were made for the reader's convenience. Furthermore, the below description and figures are merely examples of specific embodiments used to describe the claims herein. One of ordinary skill in the art would recognize other alternatives, modifications, and variations.

Figure 1:
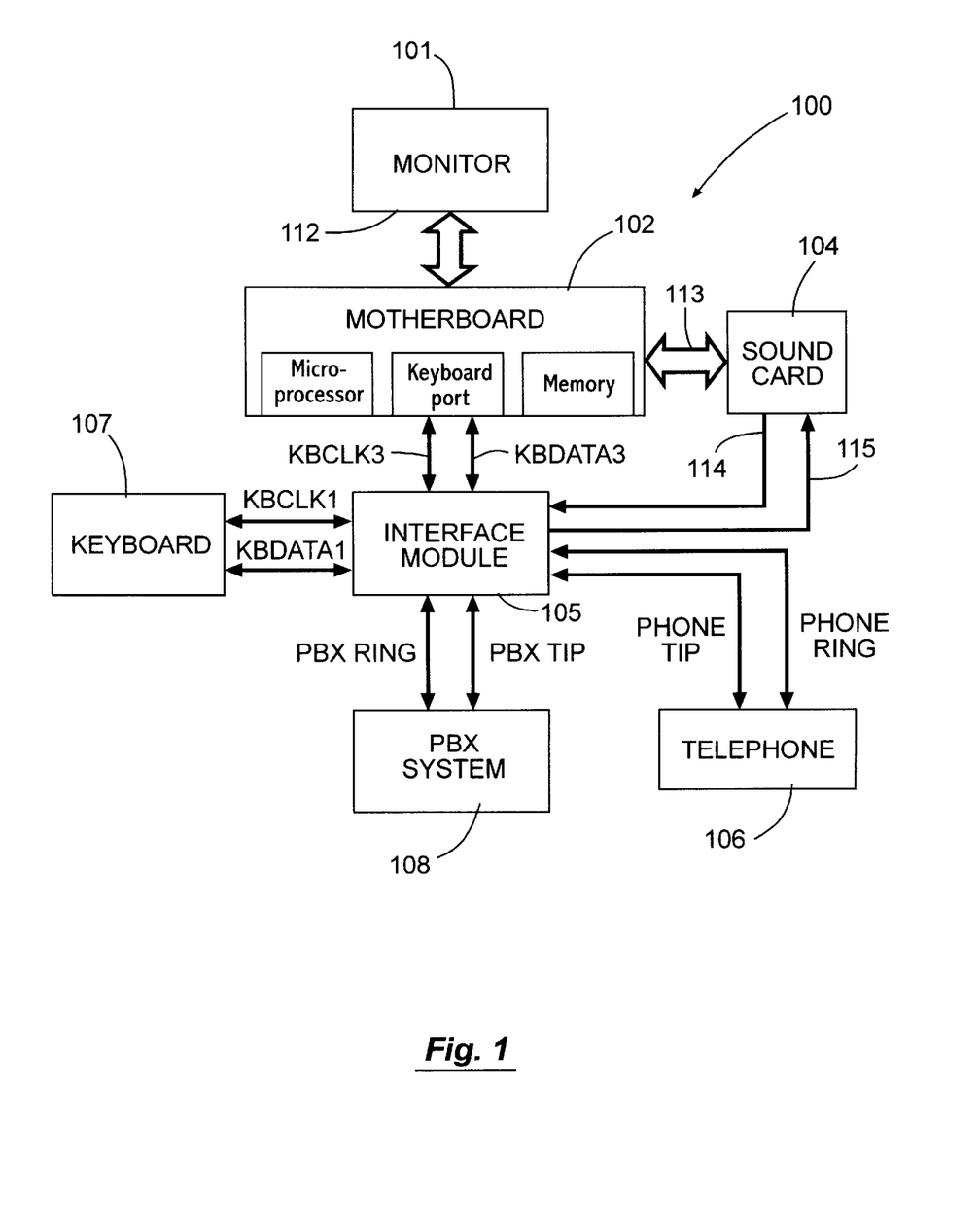
FIG. 1 is a simplified block diagram of a computer telephone system according to the present invention.

FIG. 1 is a simplified block diagram of a computer telephone system 100 according to the present invention. The system 100 comprises a monitor 101, a computer motherboard 102, an interface module 105, a sound card 104, a keyboard 107, a telephone 106, a PBX system 108, and others. Of course, other elements can be provided depending upon the application.

Motherboard 102 often includes a microprocessor, a random access memory (RAM), a read only memory (ROM), an input/output (I/O) decoder and other support circuitry generally found in a microcomputer-based main board. The motherboard can be any suitable microprocessor-type unit with sufficient I/O and memory capacity.

Interface module 105 includes circuitry for bridging the motherboard 102 to a PBX system 108 and converting signal levels between them. Interface module 105 sends signals to and from the motherboard 102 through at least lines KBCLK3 and KBDATA3, which are coupled to a keyboard input port (not shown) on the motherboard 102. A keyboard interface on the motherboard 102 interprets incoming codes from this keyboard input port. By way of the keyboard input port, no substantial modifications are required to the motherboard, thereby providing a plug-and-play system. Preferably, using the keyboard input port, no other input/output devices are necessary. Of course, other ports can be used, depending upon the application.

Motherboard 102 sends video information for display to the monitor 101 through at least a line 112. Digital audio data are transferred between the motherboard 102 and the sound card 104 through at least a line 113. Sound card 104 translates the audio data from digital form to analog form and outputs to a line 114, which is coupled to the interface module 105. Analog audio signal is sent from the interface module 105 to the sound card 104 through line 115.

Telephone 106 is coupled to the interface module 105 through lines including PHONE_TIP and PHONE_RING. These are standard twisted pair lines used in generally all conventional telephones. The telephone can be almost any suitable telephone unit. As for the interface module, it receives the lines through standard telephone-type connections, e.g., RJ-11, RJ-45, etc., which complies with the plug-and-play principle.

Keyboard 107 is coupled to the interface module 105 through lines including KBCLK1 and KBDATA1. The keyboard can be any suitable user interface unit having keys, etc. A mouse also can be used as a user interface unit, especially with a graphical user interface display. The keyboard (or mouse) couples to the interface module using a conventional keyboard (or mouse) interface connection. This provides for a system which can be plugged-in easily.

Interface module 105 is coupled to the PBX system 108 through lines including PBX TIP and PBX RING. The lines PBX TIP and PBX RING are generally in the form of a pair of telephone lines (e.g., a two-wire signal) with a phone jack at one end. An example of this phone line is a twisted pair or the like. Similar to the above elements, the PBX TIP and PBX RING lines easily plug into the interface module using conventional connections, e.g., RJ-11, RJ-45, etc.

Figure 2:
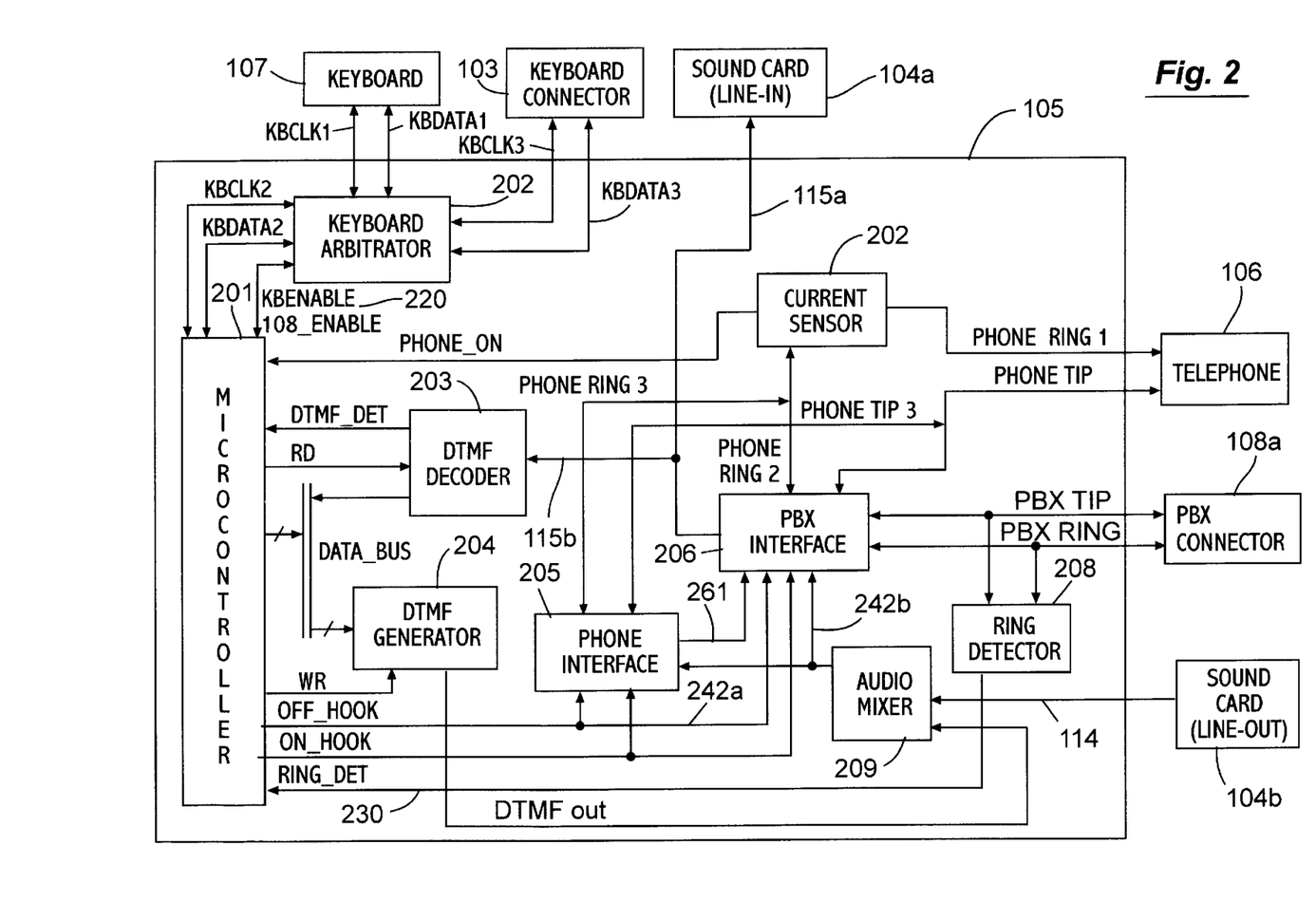
FIGS. 2, 2A, and 2B are simplified block diagrams of an interface module circuit according to the present invention.

FIG. 2 is a more detailed diagram of the interface module block 105 and other related components according to the present invention. This diagram is merely an example and should not limit the scope of the claims herein.

Keyboard 107 and telephone 106 are similar to those shown in FIG. 1, but can also be others. Sound card line-in 104a is the line-in port of the sound card 104, and sound card line-out 104b is the output port of the sound card 104. PBX connector 108a is coupled to the PBX system 108, and keyboard connector 103 is connected to the keyboard I/O port of the motherboard 102.

Interface module 105 includes a microcontroller 201, a keyboard arbitrator 202, a DTMF (dual tone multi-frequency) decoder 203, a DTMF generator 204, a phone interface 205, a PBX interface 206, a current sensor 207, a ring detector 208, an audio mixer 209, and other elements. Microcontroller 201 sends data or special key codes to the motherboard 102 through the keyboard connector 103 via lines KBDATA3 and KBCLK3 and lines KBCLK2 and KBDATA2. The lines labeled KBDATA3 AND KBDATA 2 generally carry data or more particularly the key codes. Lines KBCLK2 and KBCLK3 illustrate those lines used for clocking signals.

The codes are interpreted by a telephone program (i.e., a software program or the like, which will be discussed in more detail below) as commands for selecting a function or for status reports of the telephone 106 and the PBX system 108. Because data are also sent from the keyboard 107 to the motherboard 102, keyboard arbitrator 202 is used as a switch in between. The keyboard arbitrator device prevents a possible conflict between a keyboard signal transmitted by a keyboard and a digital signal transmitted by the microcontroller. In addition, the keyboard arbitrator device determines whether a signal from the motherboard should be sent to the keyboard or to the microcontroller, since both the keyboard and the microcontroller receives signals from the motherboard. In some cases, the keyboard arbitrator device prevents the keyboard from receiving codes which are intended to be sent to the microcontroller or the like.

When KB_ENABLE 220 is set active, the keyboard 107 is connected to the keyboard connector 103. Alternatively, microcontroller 201 is connected to the keyboard connector 103 when KB_ENABLE is set inactive. By sharing the I/O channel with the keyboard 107, interface module 105 does not require additional I/O ports from the main board to carry out these functions, which complies with the plug-and-play principle.

When DTMF decoder 203 detects a DTMF sound signal on line 115b, it sets DTMF_DET to active and internally translates the DTMF signal into its digital or binary representative ready for output. DTMF_DET is set active to inform the microcontroller 201 that the DTMF sound signal is ready to be read. Microcontroller 201 sets RD to active, which prompts the DTMF decoder 203 to put the decoded digital or binary data onto DATA_BUS, which are then read by the microcontroller 201. DTMF generator 204 translates the digital or binary data into its DTMF representation. When microcontroller 201 has digital or binary data to be sent, it sets WR to active, which prompts the DTMF generator 204 to read the digital or binary data from the DATA_BUS. DTMF generator 204 translates the data to produce the corresponding DTMF sound signal on DTMF_OUT, which is coupled to audio mixer 209.

The audio signals from the PBX system connector 108a and telephone 106 are generally different (i.e., number of lines necessary to carry the signals, reference point, etc.) from those signals from the sound card 104, the DTMF decoder 203, and the DTMF generator 204. In particular, the audio signals running in the telephone lines are differential in nature, with no common ground, while signals in and from other parts of the interface module 105 have been referenced to a common ground. Thus, when the signal lines are coupled to the telephone 106 or the PBX system connector 108a, two lines (e.g., PHONE_RING1 and PHONE_TIP, PBX_TIP and PBX_RING, etc.) are depicted. Alternatively, signals from the sound card 104, the DTMF decoder 203, and the DTMF generator 204 each includes a single line.

Figure 2A:
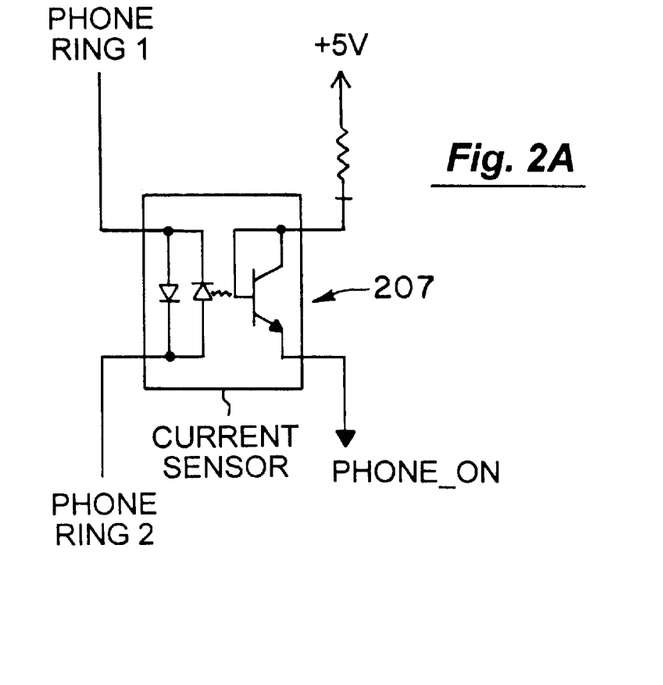

Telephone 106 is coupled to lines PHONE_RING1 and PHONE_TIP. PBX interface 206 is coupled to lines PHONE_TIP and PHONE_RING2. Lines PHONE_RING1 and PHONE_RING2 are coupled to the current sensor 207, which is further illustrated by FIG. 2A. When the handset of telephone 106 is picked up, current flows through lines PHONE_RING1 and PHONE_RING2. When current sensor 207 detects this current, it will set PHONE_ON to active via five volt reference voltage, and informs the microcontroller 201 that the handset of telephone 106 has been picked up.

Figure 2B:
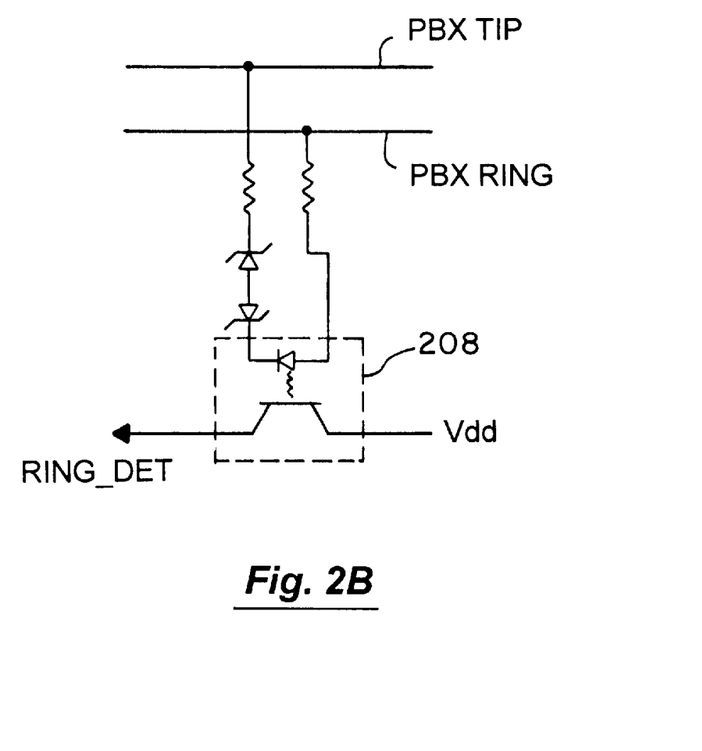

PBX system connector 108a is connected to the PBX interface through lines PBX_TIP and PBX_RING. When ring detector 208 senses a ring signal (e.g., a 60–70V AC signal) coming through lines PBX_RING and PBX_TIP, it sets RING_DET 230 to active via $V_{dd}$ reference voltage, and informs the microcontroller 201 that a call is coming in. FIG. 2B illustrates the ring detector 208 in more detail. As noted, signals from the telephone 106 and PBX system 108 are differential, while those from the sound card 104 are referenced to common ground. Therefore, PBX interface 206 and phone interface 205 are used as a bridge in between. PBX interface 206 transforms an audio signal from the sound card 104 into differential signals acceptable by the PBX system 108, and vice versa. Phone interface 205 transforms audio signals from the sound card 104 into differential signals acceptable by the telephone 106, and vice versa.

PBX interface 205 is coupled to the telephone 106 through lines PHONE_TIP and PHONE_RING2. PBX interface 206 is coupled to the PBX system 108 through lines PBX_TIP and PBX_RING. PBX interface 206 receives signal from the sound card through the audio mixer via lines 242b and 114. PBX interface 206 outputs an audio signal to lines 115a and 115b, which is received by the sound card 104 and DTMF decoder 203, respectively.

Phone interface 205 is coupled to the telephone 106 through lines including PHONE_TIP3 and PHONE_RING3. Phone interface 205 receives signals from the sound card through line 242a. Phone interface 205 outputs an audio signal to line 241, which is received by the PBX interface 206. The signals received by the PBX interface 206 is then output to the sound card 104 and the PBX system 108. Microcontroller 201 also sends control signals to the PBX interface 206 and the phone interface 205 through lines OFF_HOOK and ON_HOOK.

The PBX interface 206 is designed such that when there is no power, the lines PHONE_TIP and PHONE_RING2 are coupled to the lines PBX_TIP and PBX_RING. Therefore, the telephone 106 is coupled to the PBX system, and can be used as a stand-alone telephone unit. When the computer is powered-on, initially the telephone 106 is still connected to the PBX system. When the telephone handset is picked up, current sensor 207 will set PHONE_ON to active. The microcontroller 201 then sends an "off-hook" key code to the keyboard interface 103, which is then read by the telephone program to activate selected subroutines, which are described below.

Many of the above hardware elements can be provided using conventional integrated circuit chips. Preferably, microcontroller 201 is a 80C51 integrated circuit sold by Intel. DTMF decoder 203 is an UM91531 integrated circuit from UMC Corp., and DTMF generator 204 is a HM9270C/D device from Elan Microelectronics Corp. Current sensor 207 is a PC814 integrated circuit and a photo coupler both sold by Sharp. Ring detector 208 is a photo detector such as a PC817 also sold by Sharp. Audio mixer 209 is typically not an independent integrated circuit, but is predominantly an operational amplifier such as LM348 sold by National Semiconductor. These integrated circuit devices are merely shown for illustrative purposes in this preferred embodiment and should not be limiting the scope of the claims herein.

In performing some of the above functions, key codes may be used, since the interface module is provided using a keyboard port. For instance, the following key codes can be used for commands that are sent to and from the microcontroller 201 to the keyboard interface 103 in the telephone program.

TABLE 1

Key Code Definitions for Commands Between the Interface Module and the Telephone Program

| Command | Key Code Definition |
| --- | --- |
| On-Hook | CTRL + ALT + SHIFT + F1 |
| Off-Hook | CTRL + ALT + SHIFT + F2 |
| * | CTRL + ALT + SHIFT + F3 |
| # | CTRL + ALT + SHIFT + F4 |
| Ring | CTRL + ALT + SHIFT + F5 |
| 0, 1, 2, . . . 9 | CTRL + ALT + SHIFT + 0, 1, 2, . . . 9 |

These key codes are seldom used by a user in other application programs (e.g., a word processor, spreadsheet, etc.), but can be recognized by the telephone program according to the present invention. These key codes distinguish the numeric keys on the keypad of the telephone from the numeric keys on the keyboard. For instance, an "On-Hook" command is provided by a CTRL+ALT+SHIFT+F1 key code definition. Of course, other key code definitions can be made depending upon the application and the ones shown in Table 1 are merely examples.

In a specific embodiment, software is provided in a memory (e.g., hard disk, floppy disk, random access memory, read only memory, etc.) to carry out the above functions. In particular, a telephone program (which will be discussed later) stored in memory is initiated by way of the microprocessor when the telephone handset is picked up. When a key is pressed on the keypad of the telephone 106, the DTMF signals pass through the PBX interface 206, and a copy of the signal is sent to the DTMF decoder 203 over line 115b. The DTMF decoder 203 decodes this sound signal and output the corresponding binary value to microcontroller 201, which translates the binary value into one of the selected key codes. The key codes are sent to the keyboard connector 103 and read by the telephone program. If the user starts to dial a phone number by pressing numeric keys on the telephone 106, no action will be taken by the telephone program, and the user can continue using the telephone in a common manner. In particular, the telephone is connected to the PBX system and can be operated in the common manner.

Figure 3:
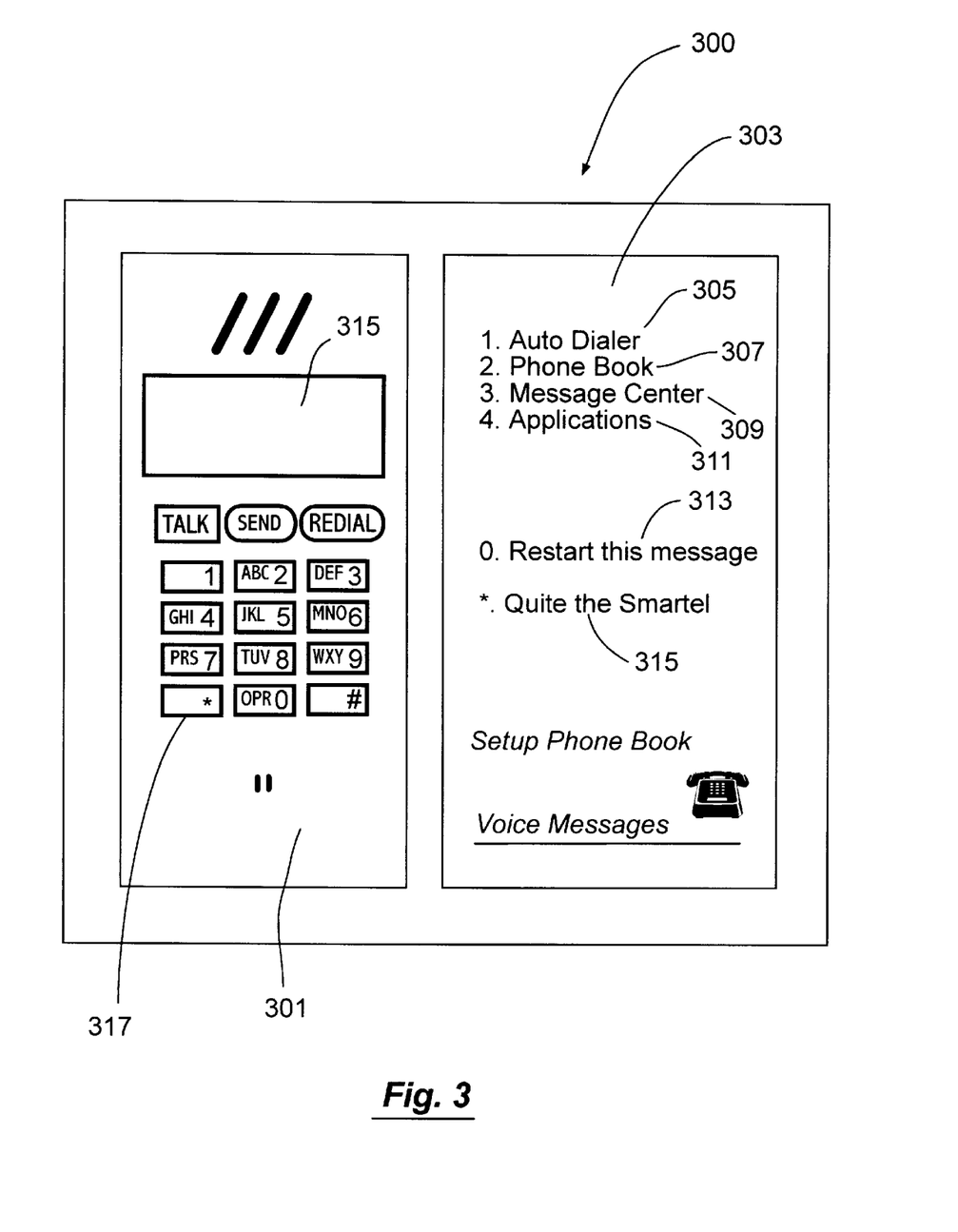
FIG. 3 is a simplified diagram of a screen menu provided by a telephone program according to the present invention.

If the "*" key is pressed, the telephone program receives the key code and produces a screen (e.g., pop-up screen) 300 with function menus on the monitor, similar to the one shown in FIG. 3. As shown, the screen depicts a portion having a telephone 301 with a telephone display 315, and a telephone keypad 317. It should be noted that a telephone keypad is different from a computer keypad, which has the digits 1, 2, and 3 lined up at the bottom of the pad. The screen also depicts a portion having a menu 303. This menu includes a variety of features such as an auto dialer 305, a phone book 307, a message center 309, other applications 311, and the like. The menu also has a restart feature 313 using "0," and a quit feature 315 using "*." The user selects one (or more) of these features by way of the telephone keypad, the keyboard, or the mouse. Although the telephone portion and the menu portion of the screen are displayed together in this embodiment, the menu portion and the telephone portion can also be displayed separately.

When the "*" key is pressed, the telephone 106 is decoupled from the PBX system and coupled to the phone interface 205. The telephone program sends a "on-hook" command to microcontroller 201, which in response sets ON_HOOK 229 to active. The PBX interface 206 reacts by decoupling the telephone 106 from the PBX system 108, thus forming an open circuit to lines PBX_TIP and PBX_RING, which the PBX system would interpret as the telephone handset being "on-hook".

Phone interface 205 is also coupled to the ON_HOOK line. When ON_HOOK is set active, phone interface 205 sources current to the telephone 106 through lines PHONE_RING3 and PHONE_TIP3. Thus, the telephone 106 is decoupled from the PBX system, and redirected to the phone interface 205. Now when the user presses a key on the keypad, the DTMF signal does not go to the PBX interface 206 directly, but rather, goes to the phone interface 205 first and then to the PBX interface 206 through line 241. By decoupling the telephone 106 from the PBX system 108, the telephone 106 can now be used to input commands to the telephone program, and use the telephone program to control the interface module 105 to send signals to the PBX system 108.

When the user selects the quick-dial function, the telephone program will send an "off-hook" command to the microcontroller 201. Microcontroller 201 sets OFF_HOOK to active, which prompts the PBX interface 206 to sink current from lines PBX_TIP and PBX_RING. The PBX system interprets these functions as meaning a handset of the telephone has been picked up, which suggests that a dial number is going to be sent over the telephone lines. The telephone program sends the selected phone number digit-by-digit to the microcontroller 201, which is then sent to the DTMF generator 204. The DTMF sound signals of the phone number is then sent to audio mixer 209, and then to the PBX interface 206, which couples the signals over lines PBX_TIP and PBX_RING to the PBX connector 108a.

When a call has been connected, the user can talk to the distant phone using either the telephone 106 or the computer's microphone and speakers. In one embodiment, if the user talks over the telephone 106, the audio signals are sent to the phone interface 205, then to the PBX interface 206. Alternatively, if the user uses the computer's microphone, the audio signals are sent from the sound card 104 to the audio mixer 209, then the PBX interface 206. The audio signals sent to the PBX interface 206 is then output to the PBX connector 108a through the PBX_RING and PBX_TIP lines. The audio signals coming from the PBX connector 108a goes in the reverse direction to the user also through the PBX_RING and PBX_TIP lines.

When the user finishes the call and hangs up the telephone, there is no current over lines PHONE_RING1 and PHONE_RING2, so the current sensor 207 sets PHONE_ON to inactive. Microcontroller 201 then sends an "on-hook" key code to the telephone program, which subsequently closes all the screen menus and return to an idle state.

When a call is directed to the telephone 106, the PBX system sends a ring signal (e.g., a 60~70V AC signal) over lines PBX_TIP and PBX_RING. The AC signal will be detected by the ring detector 208, which in turn sets RING_DET to active. Microcontroller 201 then sends a "ring" key code to the telephone program, which in turn activates the answering machine subroutine. This subroutine is shown in the FIG. 7 below.

If the telephone handset is picked up before a preset number of rings, the telephone program returns to its idle state and the user can talk to the caller in the common manner. If the telephone 106 is not picked up after a preset number of rings, the telephone program produces a voice guide to the sound card 104, which sends the audio signal to the PBX interface 206. The distant caller reacts to the voice guide by pressing numeric keys to select the functions. The voice guide generally recites functions or applications, which are provided by the menu of the display or pop-up screen. The DTMF signals of the pressed keys are sent to the PBX interface 206, interpreted by the DTMF decoder 203, then sent from the microcontroller 201 to the telephone program.

If the user wishes to leave messages, the voice signals are coupled to the PBX interface 206, sent to the line-in port of the sound card 104, then further processed by the telephone program. If the caller wishes to hear messages in the phone mailbox, the voice signals are generated by the sound card, output to the PBX interface 206, then coupled to the PBX system. Password protection may be implemented by the telephone program. The user can return to the main menu by pressing the "#" key.

When the caller hangs up the phone, the line-off tone sent over the telephone lines will be detected by the DTMF decoder. The telephone software then sends an "off-hook" key code to the microcontroller 201, which in turn sets OFF_HOOK to active. The phone interface 205 stops driving current to the telephone 106, and the PBX interface 206 redirects the telephone 106 to the PBX system 108. The telephone program then returns to an idle state.

The above description is in terms of both hardware and software including the key codes. A further understanding of the invention, however, can occur by way of the flow diagrams comprising at least a telephone program and its subroutines, which are shown below.

Figure 4:
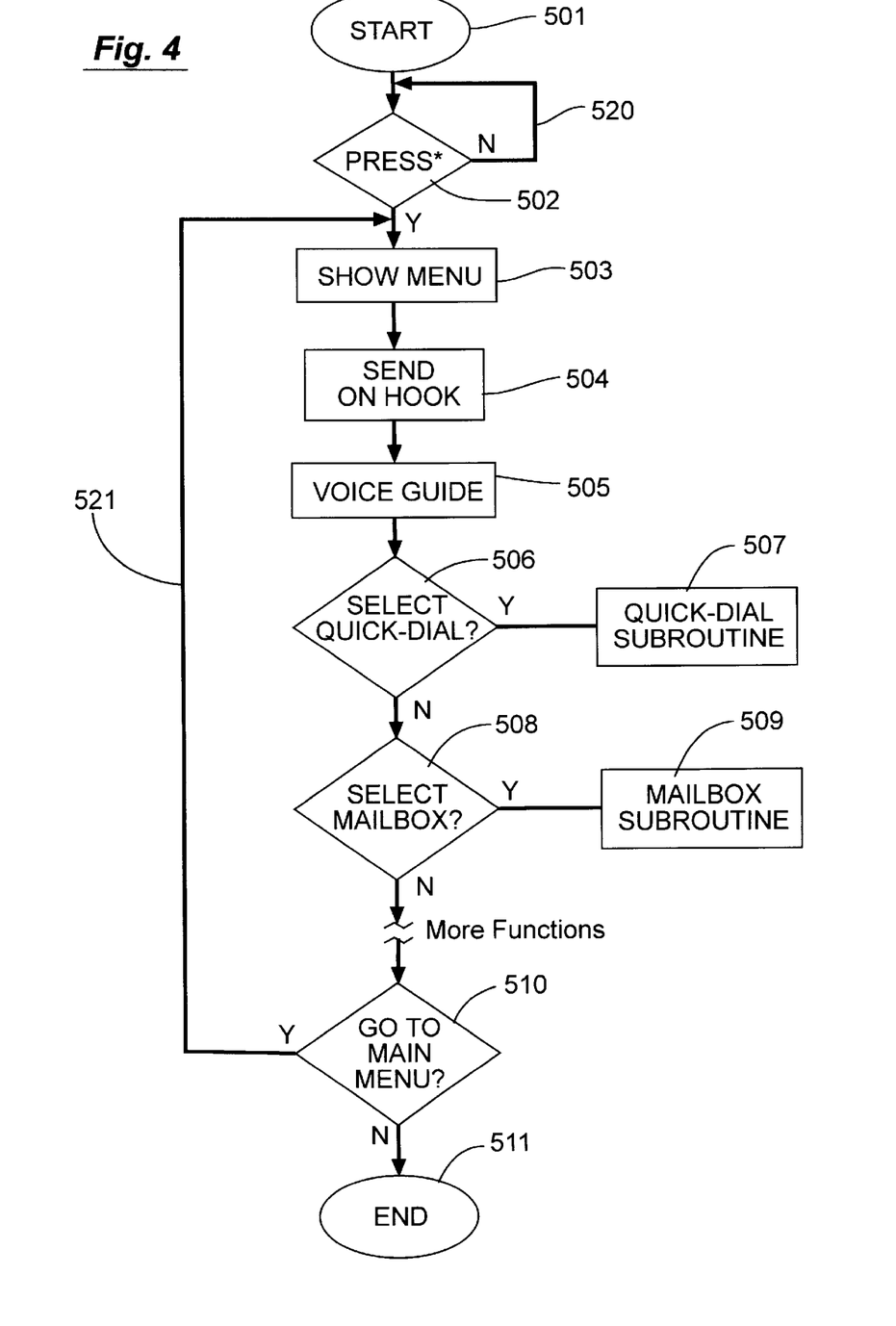
FIG. 4 is a simplified flow chart diagram of a telephone program according to the present invention.

FIG. 4 is a simplified flow diagram of a telephone program and its functions according to the present invention. The flow diagram is merely an illustration and should not limit the scope of the claims as defined herein.

The program is often initialized when the telephone handset is picked up at start 501. If the "*" key is pressed 502, a function menu 503 is provided. Alternatively, the telephone program waits for the "*" key via branch 520. An "on-hook" key code is then sent to the interface module 504. Voice guide data is sent to the audio card 505. If the user selects a quick-dial function 506, the quick-dial subroutine is called up 507. If the user selects a mailbox function 508, then the mailbox subroutine 509 is called up. These subroutines will be discussed in more detail below. If the user selects to see the main menu 510, then the procedures beginning the menu 510 in the telephone program are repeated via branch 521. The menu in the telephone program can return the user to the main menu. Alternatively, the telephone program ends 511.

Figure 5:
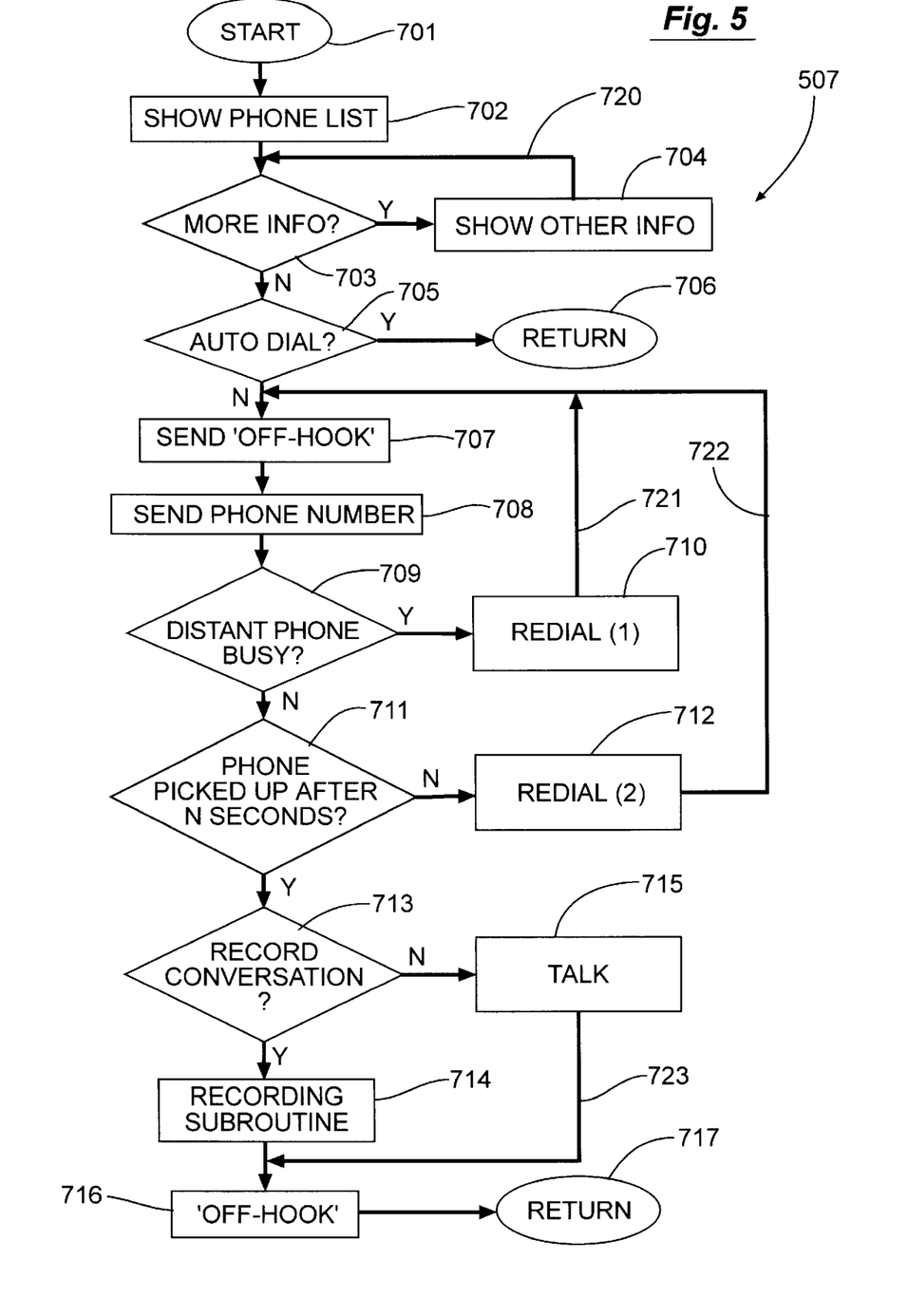
FIGS. 5–7 are simplified flow charts of software sequences for subroutines used by the telephone program according to the present invention.

FIG. 5 is a simplified flowchart of the quick-dial subroutine according to the present invention. The flow diagram is merely an illustration and should not limit the scope of the claims as defined herein.

Referring to FIG. 5, the quick-dial subroutine begins at start 701 from a signal from the telephone program 507 of FIG. 4. The subroutine prompts a phone list 702. In addition to the phone number, there can be other related data such as an address, a company name, a date of birth, for example, via branch 720. If the user decides to view this data 703, then additional information is displayed 704. Alternatively, the subroutine executes the next function 705. At this next function, if the user decides to terminate the quick-dial subroutine after viewing the data, then the subroutine returns to the telephone program 706. Alternatively, an "off-hook" command is sent to the interface module 707. The phone number is sent digit by digit to the interface module 708.

If the distant telephone is busy 709, the number is re-dialed 710. This also returns the subroutine to 707 via branch 721. Alternatively, the subroutine executes the next function 711. If the distant phone rings for over a specific number of seconds 711, the line is cut off and the phone number is re-dialed 712 after a specific number of minutes. After re-dialing, the subroutine returns to 707 via branch 722. Alternatively, the subroutine executes the next function 713.

After the distant phone is connected, if the user decides, with the other party's consent, to record the conversation 713, a recording subroutine or answering machine 714 is executed. Alternatively, the user begins talking 715 to the distant caller. After the conversation ends, an "off-hook" signal 716 is sent via branch 723 to the interface module, and the subroutine returns 717 to the telephone program.

Figure 6:
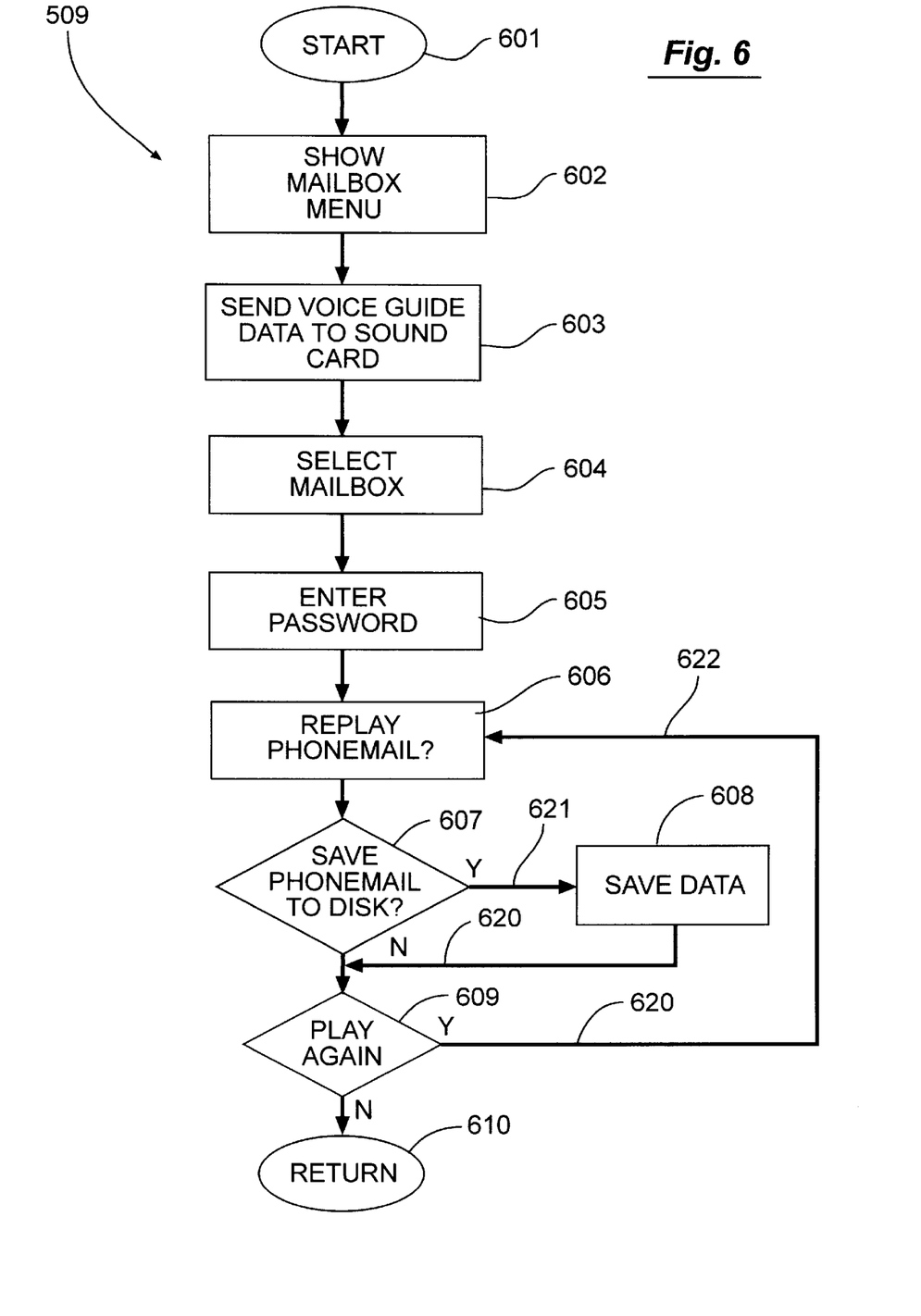

FIG. 6 is a simplified flowchart of the mailbox subroutine according to the present invention. The flow diagram is merely an illustration and should not limit the scope of the claims as defined herein.

The mailbox subroutine 509 is initiated from the telephone program of FIG. 4. The mailbox subroutine 509 begins at start 610. This subroutine prompts the mailbox menu 602. Voice guide data are sent to sound card 603. The user selects a specific phone mailbox 604, and then enters a password 605. Phone mail 606 is replayed upon receiving the correct password. The subroutine then asks the user if the voice data are to be saved 607. The voice data are saved 608 to a storage media if a yes is received via branch 621. Alternatively, the subroutine asks the user if the message should be replayed 609. If the user decides to replay the message, the subroutine returns to the program via branch 622. Alternatively, the mailbox subroutine returns 610 to the telephone program.

Figure 7:
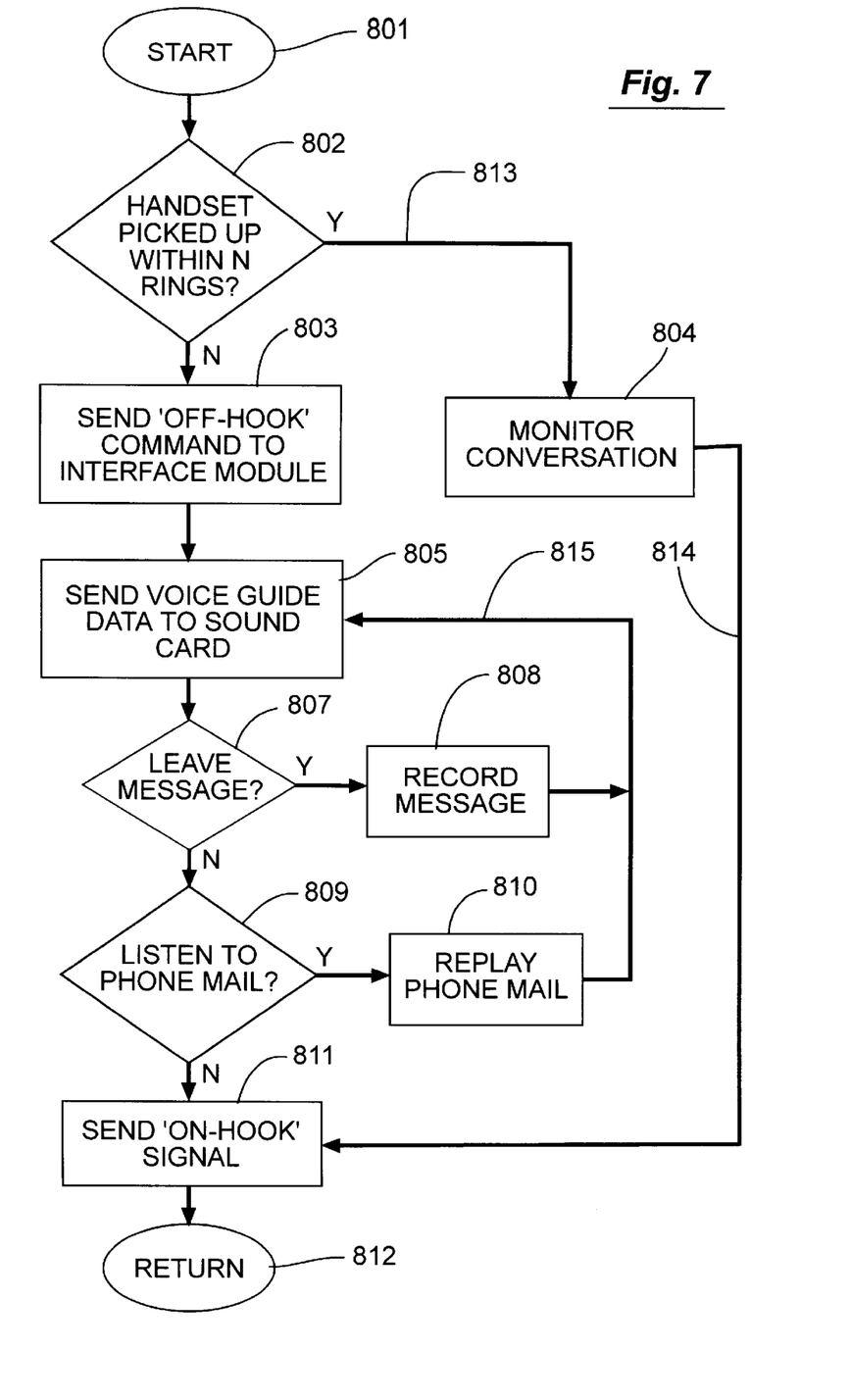

FIG. 7 is a simplified flowchart of an answering machine subroutine according to the present invention. The flow chart is merely an illustration and should not limit the scope of the claims herein.

Referring to FIG. 7, the subroutine begins at 801 and then the number of rings is counted 802. If the handset is picked up within "N" rings, the program monitors the conversation 804 via branch 813 and sends an "on-hook" signal 811 when the conversation ends via branch 814.

If the handset is not picked up within "N" rings, the answering machine is initiated. An "off-hook" signal 803 is sent to the interface module 105, and voice guide data are sent 805 to the sound card 104. If the distant caller decides to leave a message 807, the message is recorded 808 and the subroutine returns to 805 via branch 815. If the distant caller decides to listen to a pre-recorded phone mail 809, the user enters a selected phone mailbox and the messages are replayed 810 before returning to step 805 via branch 815. The steps between 805 and 809 are often repeated until the distant caller decides to hang up, then the "on-hook" signal is given 811. The subroutine is terminated and returns 812 to the telephone program. Of course, other subroutines may be used with the present telephone program. These subroutines will depend upon the particular application.

While the above is a full description of the specific embodiments, various modifications, alternative constructions and equivalents may be used. For example, while the description above is in terms of conventional computer and telephone systems, it would be possible to implement the present invention with other types of computers such as workstations, network computers, etc., and telephone systems.

Therefore, the above description and illustrations should not be taken as limiting the scope of the present invention which is defined by the appended claims.

What is claimed is:

1. A telecommunication apparatus for connecting a telephone to a computer, said telecommunication apparatus comprising an interface module, said interface module comprising:

a microprocessing type unit, said microprocessing type unit transmitting a digital signal, said digital signal being converted from a signal from a telephone;

a keyboard arbitrator device coupled to said microprocessing type unit, said keyboard arbitrator device preventing a possible conflict between a keyboard signal transmitted by a keyboard and said digital signal transmitted by said microprocessing type unit; and  an output port coupled to said keyboard arbitrator device, said output port being used for providing a keycode signal to a keyboard port on a motherboard, said keycode signal being derived from either said keyboard signal or said digital signal;

wherein said keyboard arbitrator device is configured to determine whether a signal received from said motherboard should be sent to said keyboard or to said microprocessing type unit and whether a signal from said keyboard should be sent to said motherboard or to said microprocessing type unit; and wherein said keyboard arbitrator device connects said output port and said microprocessing type unit when communication between the computer and the phone is requested while preventing the keyboard from receiving said digital signal sent from the microprocessing type unit to said motherboard.

2. A method of integrating a telephone with a computer, said method comprising:

providing a computer having a motherboard, said motherboard comprising a microprocessor unit, a memory, and a keyboard port, and providing a telephone having a telephone connector;

providing an interface module having
an interface module port;
a microcontroller;
a keyboard arbitrator device connected to said microcontroller via a first clock line and a first data line and to said interface module port via a second clock line and a second data line, said keyboard arbitrator device for preventing a keyboard from receiving a digital signal from said computer that is intended to be sent to said microcontroller, and for preventing a possible conflict between digital signals sent from said microcontroller and from a user input device to said computer; and
an interface module telephone port;

connecting said computer to said interface module using said keyboard port coupled to said interface module port so that said motherboard is in electrical communication with said microcontroller; and connecting said telephone to said interface module using said interface module telephone port coupled to said telephone connector.

3. The method of claim 2 wherein said user input device comprises a keyboard, and further comprising providing said keyboard having a keyboard interface, and connecting said keyboard interface to said interface module.

4. A telecommunications apparatus comprising:

a computer having telephone functions, said computer comprising
a motherboard; and
a monitor coupled to motherboard and comprising a display, said display having a first portion depicting a telephone keypad comprising numbers 1, 2, 3, 4, 5, 6, 7, 8, 9, 0, *, and #, and a second portion depicting a menu comprising a plurality of applications, wherein said plurality of applications include at least one selected from a group consisting of a mailbox application, a quick dial application and an answering machine application; and
an interface module including a keyboard arbitrator device, said keyboard arbitrator device coupled to said motherboard via a keyboard port on said motherboard;
said interface module configured to provide bi-directional communication between said motherboard and a telephone, between said motherboard and a user input device, and between said user input device and said telephone while preventing communication between said motherboard and said telephone from being received by said user input device.

5. The computer of claim 4 further comprising a keyboard, said keyboard coupled to said interface module using an interface module keyboard port.

6. An interface module for connecting a telephone to a computer, said interface module comprising:

a first interface module port for transmitting signals to a keyboard port of the computer;
a second interface module port for receiving signals from a keyboard;
an interface module telephone port for receiving and transmitting a signal from and to a telephone;
a keyboard arbitrator device coupled to said first interface module port via a first clock line and a first data line and to said second interface module port via a second clock line and a second data line for preventing a possible conflict between the keyboard and the telephone; and
a microcontroller coupled to said keyboard arbitrator device via a third clock line and a third data line and to said interface module telephone port, wherein said arbitrator device is configured to determine whether a digital signal received from the computer should be sent to the keyboard or to said microcontroller, and wherein said arbitrator device prevents a signal sent from the computer to said microcontroller from being sent to the keyboard.

7. The interface module of claim 6 wherein said microcontroller is coupled to said interface module telephone port for converting a telephone signal to a keycode for transmission to said keyboard port.

8. The interface module of claim 6 is provided in a computer having a motherboard, said motherboard providing said keyboard port.

9. An apparatus for telecommunication, said apparatus comprising:

a motherboard comprising a microprocessor, a memory, and a keyboard port; and
an interface module for coupling a telephone to said motherboard, said interface module comprising:
a first interface module port for transmitting digital signals to and from said keyboard port in said motherboard;
a second interface module port for transmitting digital signals to and receiving signals from a user interface device;
an interface module telephone port for receiving and transmitting a telephone signal from and to a telephone;
a keyboard arbitrator device coupled between said first and said second interface module ports, said keyboard arbitrator device for preventing a possible conflict between a first digital signal transmitted by said user interface device and a second digital signal transmitted from said telephone to said keyboard port via said first interface module port; and
a microcontroller coupled to said keyboard arbitrator device and to said interface module telephone port wherein said arbitrator device determines whether an electrical communication sent from said motherboard to said interface module is intended to be sent to the user interface device via the second interface module port or to said microcontroller.

10. The apparatus of claim 9 further comprising a telephone network port for receiving and transmitting signals from and to telephone network equipment.

11. The apparatus of claim 9, wherein said interface module further comprises a sound card port for receiving and transferring signals from and to a sound card.

12. The apparatus of claim 9 wherein said user interface device comprises a keyboard.

13. The apparatus of claim 9 wherein said microcontroller is coupled to said telephone port for converting a telephone signal to a keycode for transmission to said keyboard port.

14. The apparatus of claim 9 wherein said interface module converts said signal from said telephone into at least one signal selected from a group consisting of a digital signal and a binary signal.

15. The apparatus of claim 14 wherein said signal from said telephone is an analog signal comprising a dual tone multi-frequency tone.

16. The apparatus of claim 9 further comprising a monitor coupled to said motherboard, said monitor comprising a display having a first portion depicting a telephone keypad and having a second portion depicting a menu for a telephone program.

17. The apparatus of claim 16 wherein said telephone program includes at least one application selected from a group consisting of a quick-dial application, a mailbox application, and an answering machine application.

18. An interface module for integrating a telephone to a computer system, said interface module comprising:
  first, second and third interface module ports, said first interface module port for coupling to a computer motherboard, said second interface module port for coupling to a user interface device, and said third interface module port for coupling to a telephone;
  a keyboard arbitrator device connected between said first interface module port and said second interface module port; and
  a microprocessing type unit coupled to said keyboard arbitrator device and said third interface module port;
  said keyboard arbitrator device for preventing said user interface device from receiving a digital signal from said motherboard that is intended for said microprocessing type unit, and said keyboard arbitrator device preventing a possible conflict between a user input digital signal transmitted by said user interface device to the computer motherboard and a digital signal transmitted by said microprocessing type unit to the computer motherboard.

19. A telecommunication apparatus for connecting a telephone to a computer, said telecommunication apparatus comprising an interface module, said interface module comprising:
  a microprocessing type unit, said microprocessing type unit for transmitting a digital signal, said digital signal being converted from a signal from a telephone;
  a keyboard arbitrator device coupled to said microprocessing type unit, said keyboard arbitrator device for preventing a possible conflict between a keyboard signal transmitted by a keyboard and said digital signal transmitted by said microprocessing type unit; and
  an output port coupled to said keyboard arbitrator device, said output port being used for providing a keycode signal to a keyboard port on a motherboard, said keycode signal selected from a group consisting of said keyboard signal and said digital signal;
  wherein said keyboard arbitrator device is configured to determine whether a signal received from said motherboard should be sent to said keyboard or to said microprocessing type unit and whether a signal from said keyboard should be sent to said motherboard or to said microprocessing type unit; and
  wherein said arbitrator connects said output port and said microprocessing type unit when communication between the computer and the telephone is requested while preventing the keyboard from receiving said digital signal sent from the microcontroller type unit to the motherboard.

* * * * *